(12) United States Patent
Dong

(10) Patent No.: US 8,111,510 B2
(45) Date of Patent: Feb. 7, 2012

(54) FLIP-OUT MULTIMEDIA CAR STEREO

(76) Inventor: Yuemin Dong, Dongguan (CN)

( * ) Notice: Subject to any disclaimer, the term of this patent is extended or adjusted under 35 U.S.C. 154(b) by 163 days.

(21) Appl. No.: 12/763,176

(22) Filed: Apr. 19, 2010

(65) Prior Publication Data

US 2011/0255217 A1 Oct. 20, 2011

(51) Int. Cl.
*G06F 1/16* (2006.01)

(52) U.S. Cl. ............... 361/679.41; 307/104; 345/214; 206/387.12; 455/462

(58) Field of Classification Search ............... 381/1, 86, 381/98, 17, 61; 361/818, 679.01, 679.02, 361/717, 752, 679.41, 679.21, 679.29; 307/10.1, 307/104; 345/77, 87, 173, 163, 156, 211, 345/214; 455/41.2, 41.3, 569.1, 569.2, 462; 206/308.1, 387.12

See application file for complete search history.

(56) References Cited

U.S. PATENT DOCUMENTS

| 7,375,439 B2 * | 5/2008 | Kobayashi | 307/10.1 |
| 2010/0166211 A1 * | 7/2010 | Snider et al. | 381/86 |
| 2010/0246155 A1 * | 9/2010 | Snider et al. | 361/818 |

* cited by examiner

Primary Examiner — Hung Duong

(57) ABSTRACT

A Flip-out multimedia car stereo comprises a top casing, a bottom casing, a disk loading driver, a flip-out device and a control circuit board. The flip-out device is installed between the top and bottom casing. The flip-out device further comprises a display monitor mount, a folding mechanism, a display monitor circuit board, a slide frame and an operating device. A slideway is placed on the inner two sides of the top casing for accommodating the slide frame. The disk loading driver is fixed onto the top of the bottom casing. The control circuit board is installed at the back of the disk loading driver. The operating device is installed at one side of the slide frame. The display monitor circuit board is installed on the slide frame.

3 Claims, 3 Drawing Sheets

FLIP-OUT MULTIMEDIA CAR STEREO

FIELD OF THE INVENTION

Present invention relates to a car stereo, more particular, a structure for a flip-out multimedia stereo for vehicle.

BACKGROUND OF THE INVENTION

A multimedia car stereo is a multi-function entertainment system installed inside of a vehicle for providing entertaining means for the driver or the passengers of the vehicle. Commons car stereo provides the function for playing DVD format of compact disks, others include the function to play VCD/MP3 or MP4 format of disks or electronic files. There are others that provide recorder, digital television, navigation and other functions. As the number of function of car stereo increases, the required number of parts also increases. However, because the limited available installation space for a car stereo in a car, it is only possible to include additional components by reducing other small car stereo parts. It is especially true for flip-out multimedia car stereo which, in general, takes up a large portion of the installation space. To accommodate the additional components, manufacturer must use smaller and more expensive parts in which raise the production cost of flip-out multimedia car stereo.

The main objective of the present invention is to provide an improved car stereo structure that efficiently employs the interior space of flip-out multimedia car stereo.

A typical flip-out multimedia car stereo comprises a top casing, a bottom casing, a disk loading driver, a flip-out device and a control circuit board. The flip-out device is generally installed between the top casing and the disk loading driver. The flip-device comprises a display monitor mount, a folding mechanism, a display monitor circuit board, a slide frame and an operating device. A slideway is installed in the inner two sides of the top casing for accommodating the slide frame. The control circuit board is installed between the disk loading driver and the bottom casing. The operating device is fixed in the center of the slide frame. The display monitor circuit board is installed at the back of rear end of the display monitor mount, in this configuration, the space required for installing the flip-out device is larger. In addition, the current configuration has the control circuit board installed between the disk loading driver and the bottom casing; having the operating device installed in the center of the slide frame and the display monitor circuit board installed at the back end of the display monitor mount. In this configuration the required space for installing the flip-out device is larger. Furthermore, in the current configuration the control circuit board is installed between the disk loading driver and the bottom casing, which limits the size of the control circuit board. In this case, requiring using smaller and more expensive control circuit board and subsequently, increasing the production cost. And finally, in current configuration, there is unused space to the two sides and to the back, in between the bottom casing, of the disk loading driver.

SUMMARY OF THE INVENTION

The objective of the present invention is to provide an improved structure for a flip-out multimedia car stereo that effectively use the space inside the stereo.

To accomplish the above objective, the present stereo employs the follow structural characteristics:

A flip-out multimedia car stereo comprises a top casing, a bottom casing, a disk loading driver, a flip-out device and a control circuit board. The flip-out device is installed in between the top casing and the disk loading driver. The flip-out device further comprises a display monitor mount, a folding mechanism, a display monitor circuit board, a slide frame and an operating device. The structure of the present invention further characterized that: a slideway is placed on the inner two sides of the top casing for accommodating the slide frame. The disk loading driver is fixed onto the top of the bottom casing. The control circuit board is installed at the back of the disk loading driver. The operating device is installed at one side of the slide frame. The display monitor circuit board is installed on the slide frame.

It is characterized that the control circuit board comprises of at least two IC boards pieced together in a 90 degree angle; the said IC boards are pieced together by buckling.

It is further characterized that the operating device comprises a fixing frame for mounting the said operating device onto the slide frame, a motor, a worm shaft, a worm gear, a gear assembly, and a rotary wheel gear; wherein, said motor and rotary wheel gear is installed at one side of the fixing frame; the worm shaft is connected to the output end of the motor; the said worm shaft engages the worm gear, and the said worm gear is connected with the rotary wheel gear through the gear assembly.

This set up proves to be space efficient, as the empty space behind and to the two sides of the loading device, and in between the bottom casing is put into use. Which minimize the height requirement of the flip-out device, increasing installation space for the disk loading driver which, larger and cheaper disk loading driver may be used to save production cost.

DETAILED DESCRIPTION OF THE PREFERRED EMBODIMENT

The features and the advantages of the present invention will be more readily understood upon a thoughtful deliberation of the following preferred embodiment with reference to the accompanying drawings.

Figure 1:
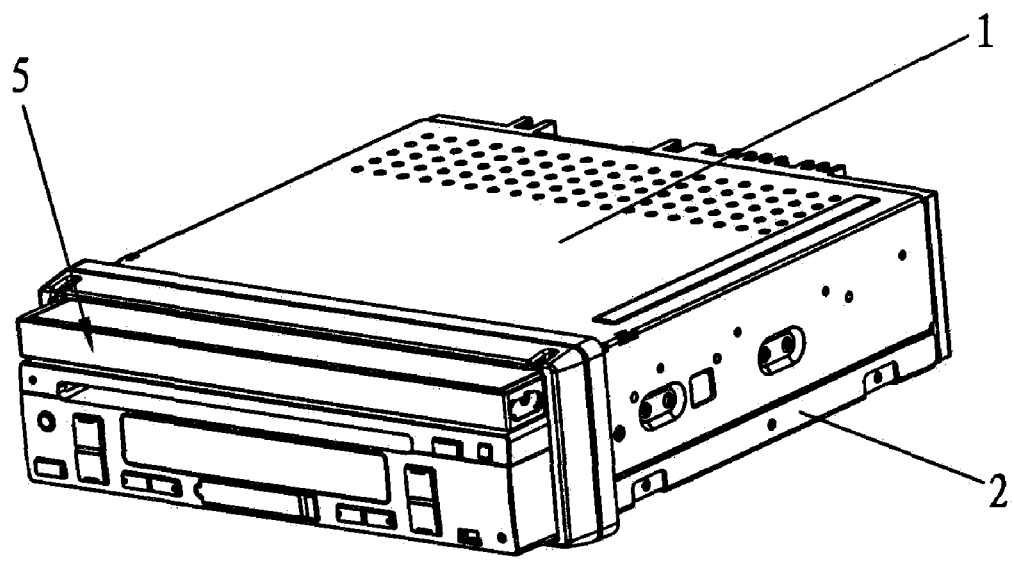
FIG. 1 is preferred embodiment of an automatic flip-out car stereo.
Figure 2:
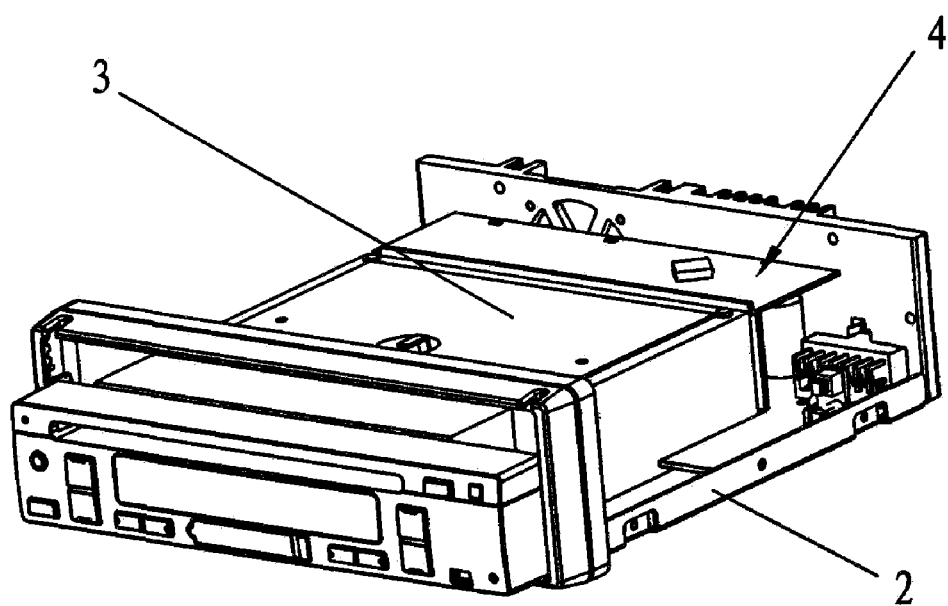
FIG. 2 is another preferred embodiment of the automatic flip-out car stereo without the top casing and the flip-out device.
Figure 3:
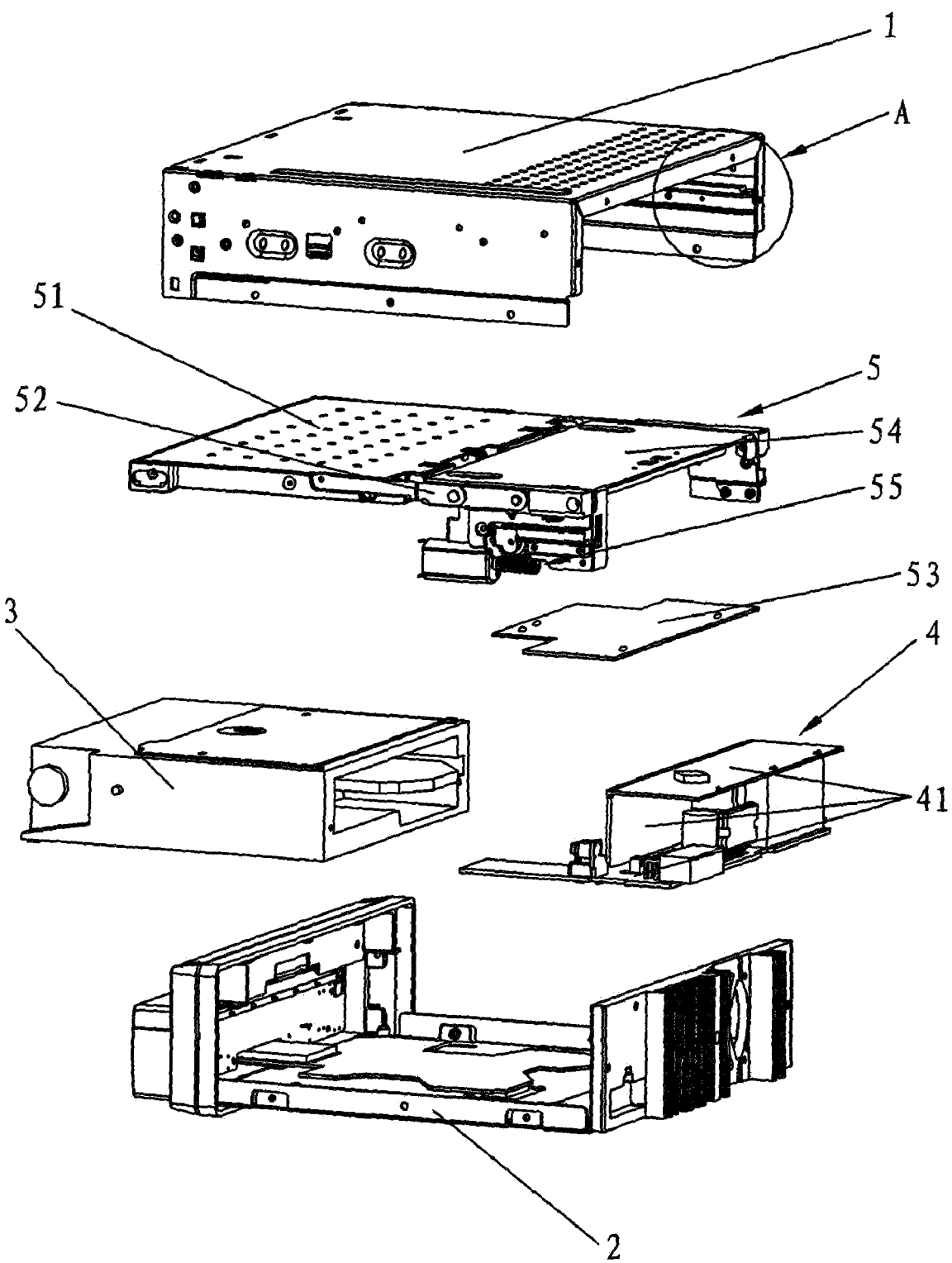
FIG. 3 is the disassemble illustration of the automatic flip-out car stereo.
Figure 4:
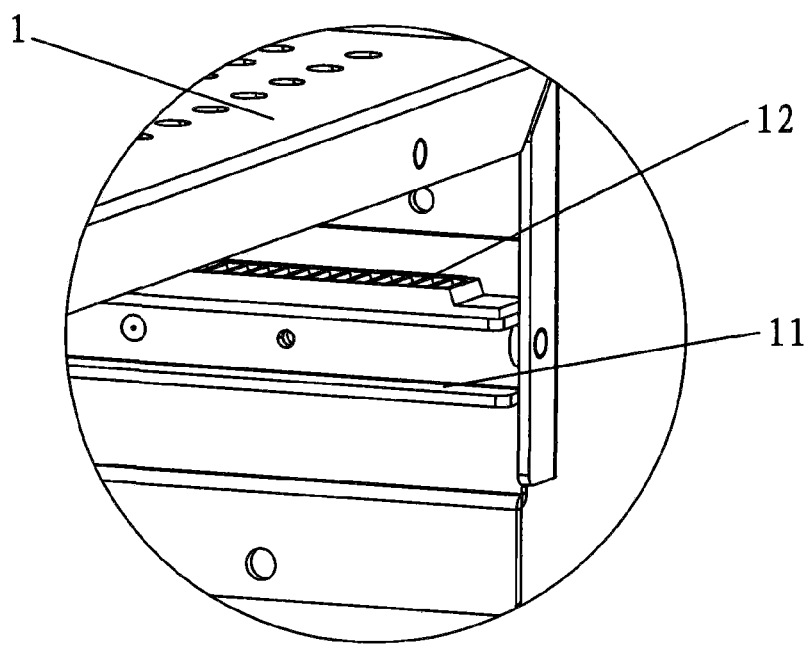
FIG. 4 is the sectional view of Part A of the FIG. 3.
Figure 5:
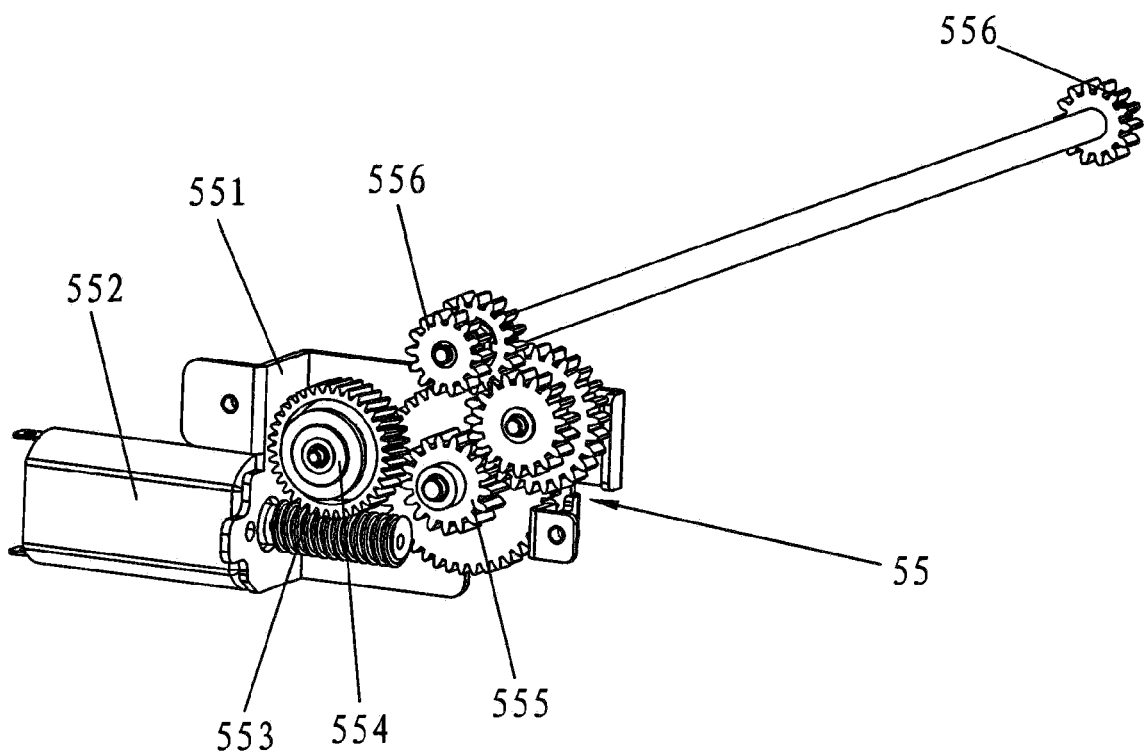
FIG. 5 is the preferred embodiment of the operating device.

Please see FIG. 1~5 for a flip-out car stereo, which comprises a top casing 1, a bottom casing 2, a disk loading driver 3, a flip-out device 5 and a control circuit board 4. The flip-out device A flip-out multimedia car stereo comprises a top casing 1, a bottom casing 2, a disk loading driver 3, a flip-out device 5 and a control circuit board 4. The flip-out device 5 is installed in between the top casing 1 and the disk loading driver 3. The flip-out device 5 further comprises a display monitor mount 51, a folding mechanism 52, a display monitor circuit board 53, a slide frame 54 and an operating device 55. The structure of the present invention further characterized that: a slideway 11 is placed on the inner two sides of the top casing 1 for accommodating the slide frame 54. The disk loading driver 3 is fixed onto the top of the bottom casing 2. The control circuit board 4 is installed at the back of the disk loading driver 3. The operating device 55 is installed at one side of the slide frame 54. The display monitor circuit board 53 is installed on the slide frame 54.

It is characterized that the control circuit board 4 comprises of at least two IC boards 41 pieced together in a 90 degree angle; the said IC boards 41 are pieced together by buckling. In this configuration, the control circuit board is fitted into the space in the back of disk loading driver 3 and in between the bottom casing 2.

It is further characterized that the operating device 55 comprises a fixing frame 551 for mounting the said operating device 55 onto the slide frame 54, a motor 552, a worm shaft 553, a worm gear 554, a gear assembly 555, and a rotary wheel gear 556; wherein, said motor 552 and rotary wheel gear 556 is installed at one side of the fixing frame 551; the worm shaft 553 is connected to the output end of the motor 552; the said worm shaft 553 engages the worm gear 554, and the said worm gear 554 is connected with the rotary wheel gear 556 through the gear assembly 555.

The structural characteristic of the present invention proves to be space efficient, as the empty space behind and to the two sides of the loading device 3, and in between the bottom casing 2 is put into use. Which minimize the height requirement of the flip-out device 5, increasing installation space for the disk loading driver which, larger and cheaper disk loading driver may be used to save production cost.

The above description for the invention is only the preferred embodiment. It is specially noted that any modification based on the same technical approach and design concept in the invention shall fall into the scope of the invention.

The invention claimed is:

1. A flip-out multimedia car stereo comprises: a top casing, a bottom casing, a disk loading driver, a flip-out device, and a control circuit board; the flip-out device is installed between the top casing and the disk loading driver; the flip-out device further comprises: a display monitor mount, a folding mechanism, a display monitor circuit board, a slide frame and an operating device; on the inner two sides of the top casing a slideway is include for accommodating the slide frame; the flip-out multimedia car stereo further characterized that: the disk loading driver is firmly fixed onto the top of the bottom casing; control circuit is installed at the back of the disk loading driver; the operating device is installed to the one side of the slide frame; and the display monitor circuit board is installed on the slide frame.

2. The flip-out multimedia car stereo as claimed in claim 1, wherein the control circuit board comprises of at least two IC boards pieced together in a 90 degree angle; the said IC boards are pieced together by buckling.

3. The flip-out multimedia car stereo as claimed in claim 1, wherein the operating device comprises a fixing frame for mounting the said operating device onto the slide frame, a motor, a worm shaft, a worm gear, a gear assembly, and a rotary wheel gear; wherein, said motor and rotary wheel gear is installed at one side of the fixing frame; the worm shaft is connected to the output end of the motor; said worm shaft engages with the worm gear, and said worm gear is connected with the rotary wheel gear through the gear assembly.

* * * * *